(12) United States Patent
Lassalle-Balier et al.

(10) Patent No.: US 12,526,012 B1
(45) Date of Patent: Jan. 13, 2026

(54) WIRELESS POWER TRANSMISSION WITH CHANNEL REDUNDANCY

(71) Applicant: Allegro MicroSystems, LLC, Manchester, NH (US)

(72) Inventors: Rémy Lassalle-Balier, Bures sur Yvette (FR); Alexander Latham, Harvard, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 18/897,328

(22) Filed: Sep. 26, 2024

(51) Int. Cl.
| | |
|---|---|
| *H04B 1/00* | (2006.01) |
| *H02J 50/40* | (2016.01) |
| *H04B 1/69* | (2011.01) |
| *H04B 5/79* | (2024.01) |
| *H02J 50/12* | (2016.01) |

(52) U.S. Cl.
CPC .............. *H04B 5/79* (2024.01); *H02J 50/402* (2020.01); *H04B 1/69* (2013.01); *H02J 50/12* (2016.02)

(58) Field of Classification Search
CPC .. H04B 5/79; H04B 1/69; H02J 50/402; H02J 50/12
USPC ........................................................ 375/130
See application file for complete search history.

(56) References Cited

U.S. PATENT DOCUMENTS

| | | |
|---|---|---|
| 4,461,966 A | 7/1984 | Hebenstreit |
| 4,748,351 A | 5/1988 | Barzegar |
| 4,970,420 A | 11/1990 | Billings |
| 5,019,719 A | 5/1991 | King |
| 5,051,609 A | 9/1991 | Smith |
| 5,430,613 A | 7/1995 | Hastings et al. |
| 5,598,135 A | 1/1997 | Maeda et al. |
| 5,847,631 A | 12/1998 | Taylor et al. |
| 5,959,846 A | 9/1999 | Noguchi et al. |
| 6,107,860 A | 8/2000 | Vinciarelli |
| 6,181,130 B1 | 1/2001 | Hoshi et al. |

(Continued)

FOREIGN PATENT DOCUMENTS

| | | |
|---|---|---|
| DE | 3700488 A1 | 7/1988 |
| DE | 10 2004 033 125 A1 | 2/2006 |

(Continued)

OTHER PUBLICATIONS

U.S. Appl. No. 18/192,932, filed Mar. 30, 2023, Horan et al.

(Continued)

*Primary Examiner* — Helene E Tayong
(74) *Attorney, Agent, or Firm* — DALY, CROWLEY, MOFFORD & DURKEE, LLP

(57) ABSTRACT

Systems, structures, packages, circuits, and methods provide wireless power and communication signal transmission systems with channel redundancy. Embodiments can be used in mechanical systems having rotating components. Two emission coils can have different topologies and can be used with three or four reception coils. The chosen topologies can be selected to ensure and/or facilitate minimal mutual inductance across topologies when the reception coils are rotated relative to the emission coils. To minimize mutual inductance between coils of different power transmission channels, twists can be added to the coil topologies to alter coil field polarity. Angle sensing can be achieved by determining efficiency of power transmission between the transmission and reception coils.

32 Claims, 11 Drawing Sheets

(56) References Cited

U.S. PATENT DOCUMENTS

| | | |
|---|---|---|
| 6,281,560 B1 | 8/2001 | Allen et al. |
| 6,377,155 B1 | 4/2002 | Allen et al. |
| 6,775,901 B1 | 8/2004 | Lee et al. |
| 6,791,851 B2 | 9/2004 | Brkovic |
| 7,023,315 B2 | 4/2006 | Yeo et al. |
| 7,119,448 B1 | 10/2006 | de Stasi |
| 7,173,835 B1 | 2/2007 | Yang |
| 7,663,351 B2 | 2/2010 | Korsunsky |
| 7,719,112 B2 | 5/2010 | Shen |
| 7,804,697 B2 | 9/2010 | Melanson |
| 7,868,431 B2 | 1/2011 | Feng et al. |
| 8,063,689 B2 | 11/2011 | Theiler |
| 8,094,458 B2 | 1/2012 | Furnival |
| 8,217,748 B2 | 7/2012 | Feng et al. |
| 8,680,837 B2 | 3/2014 | Zeng et al. |
| 8,736,343 B2 | 5/2014 | Chen et al. |
| 8,816,666 B2 | 8/2014 | Kimura et al. |
| 9,048,020 B2 | 6/2015 | Calvillo Cortes et al. |
| 9,660,584 B2 | 5/2017 | Modi et al. |
| 9,743,523 B2 | 8/2017 | Huang et al. |
| 9,847,166 B2 | 12/2017 | Kneller |
| 9,887,034 B2 | 2/2018 | Francis |
| 9,899,140 B2 | 2/2018 | Kneller et al. |
| 9,922,764 B2 | 3/2018 | Kneller et al. |
| 9,941,999 B1 | 4/2018 | Milesi et al. |
| 9,948,294 B2 | 4/2018 | Peter et al. |
| 9,967,888 B1* | 5/2018 | Zappaterra ............ H04L 5/0053 |
| 10,002,703 B2 | 6/2018 | Wang et al. |
| 10,014,798 B1 | 7/2018 | Vinciarelli |
| 10,062,495 B2 | 8/2018 | Lloyd |
| 10,074,713 B1 | 9/2018 | Briano |
| 10,074,939 B1 | 9/2018 | Briano |
| 10,142,052 B2 | 11/2018 | Milesi et al. |
| 10,176,917 B2 | 1/2019 | Parish et al. |
| 10,217,558 B2 | 2/2019 | Kneller |
| 10,224,143 B2 | 3/2019 | Kneller et al. |
| 10,229,779 B2 | 3/2019 | Harber |
| 10,234,513 B2 | 3/2019 | Vig et al. |
| 10,236,932 B1 | 3/2019 | Briano |
| 10,256,027 B2 | 4/2019 | Li et al. |
| 10,290,608 B2 | 5/2019 | Latham et al. |
| 10,319,509 B2 | 6/2019 | Kneller et al. |
| 10,347,413 B2 | 7/2019 | Francis |
| 10,380,879 B2 | 8/2019 | Haas et al. |
| 10,498,384 B2 | 12/2019 | Briano |
| 10,573,457 B2 | 2/2020 | Wang et al. |
| 10,580,289 B2 | 3/2020 | Haas et al. |
| 10,636,285 B2 | 4/2020 | Haas et al. |
| 10,651,147 B2 | 5/2020 | Latham et al. |
| 10,692,362 B2 | 6/2020 | Petrie et al. |
| 10,811,181 B2 | 10/2020 | Parish et al. |
| 10,930,422 B2 | 2/2021 | Francis |
| 11,115,244 B2 | 9/2021 | Briano et al. |
| 11,139,102 B2 | 10/2021 | Kneller et al. |
| 11,201,619 B2 | 12/2021 | Rinne et al. |
| 11,211,929 B2 | 12/2021 | Rinne et al. |
| 11,228,466 B2 | 1/2022 | Petrie et al. |
| 11,282,631 B2 | 3/2022 | Francis |
| 11,289,406 B2 | 3/2022 | Briano et al. |
| 11,326,903 B1 | 5/2022 | Casu et al. |
| 11,342,288 B2 | 5/2022 | Briano et al. |
| 11,515,246 B2 | 11/2022 | Chetlur et al. |
| 11,721,648 B2 | 8/2023 | Briano et al. |
| 11,764,778 B2 | 9/2023 | Rinne et al. |
| 11,973,008 B2 | 4/2024 | Briano et al. |
| 12,203,822 B2 | 1/2025 | Casu et al. |
| 2008/0025246 A1* | 1/2008 | Anderson ............ H04W 52/48 |
| | | 370/318 |
| 2009/0147544 A1 | 6/2009 | Melanson |
| 2009/0237899 A1 | 9/2009 | Furnival |
| 2012/0008344 A1 | 1/2012 | Zeng et al. |
| 2012/0206171 A1 | 8/2012 | Kimura et al. |
| 2013/0293268 A1 | 11/2013 | Draxelmayr et al. |
| 2016/0181004 A1 | 6/2016 | Li et al. |
| 2021/0057330 A1 | 2/2021 | Briano et al. |
| 2021/0376822 A1 | 12/2021 | Thompson et al. |
| 2022/0116036 A1 | 4/2022 | Rinne et al. |
| 2023/0370954 A1* | 11/2023 | Kim ..................... H04W 76/27 |
| 2024/0044946 A1 | 2/2024 | Briano et al. |
| 2024/0234257 A1 | 7/2024 | Briano et al. |

FOREIGN PATENT DOCUMENTS

| | | |
|---|---|---|
| GB | 2 250 383 A | 6/1992 |
| GB | 2 341 288 A | 3/2000 |
| JP | H 01-300617 A | 12/1989 |
| JP | 2001-167941 A | 6/2001 |
| JP | 2003-234234 A | 8/2003 |
| JP | 2008-072021 A | 3/2008 |
| WO | WO 93/21690 | 10/1993 |
| WO | WO 95/12247 | 5/1995 |
| WO | WO 2009/008739 A1 | 1/2009 |
| WO | WO 2010/061281 A2 | 6/2010 |
| WO | WO 2011/137845 A1 | 11/2011 |
| WO | WO 2021/211920 A1 | 10/2021 |

OTHER PUBLICATIONS

U.S. Appl. No. 18/297,034, filed Apr. 7, 2023, Torti.
U.S. Appl. No. 18/300,708, filed Apr. 14, 2023, Mangtani et al.
U.S. Appl. No. 18/300,711, filed Apr. 14, 2023, Taylor et al.
U.S. Appl. No. 18/302,998, filed Apr. 19, 2023, Salato et al.
U.S. Appl. No. 18/303,740, filed Apr. 20, 2023, Horan et al.
U.S. Appl. No. 18/307,921, filed Apr. 27, 2023, Salato et al.
U.S. Appl. No. 18/321,859, filed May 23, 2023, Horan et al.
U.S. Appl. No. 18/327,292, filed Jun. 1, 2023, Horan et al.
U.S. Appl. No. 18/338,479, filed Jun. 21, 2023, Taylor.
U.S. Appl. No. 18/340,053, filed Jun. 23, 2023, Salato et al.
U.S. Appl. No. 18/349,266, filed Jul. 10, 2023, Mangtani et al.
U.S. Appl. No. 18/350,049, filed Jul. 11, 2023, Taylor.
U.S. Appl. No. 18/456,666, filed Aug. 28, 2023, David et al.
U.S. Appl. No. 18/477,755, filed Sep. 29, 2023, Thompson.
U.S. Appl. No. 18/495,060, filed Oct. 26, 2023, Mangtani et al.
U.S. Appl. No. 18/519,254, filed Nov. 27, 2023, Chandra et al.
U.S. Appl. No. 18/524,130, filed Nov. 30, 2023, Chandra et al.
U.S. Appl. No. 18/524,132, filed Nov. 30, 2023, Chandra et al.
U.S. Appl. No. 18/533,527, filed Dec. 8, 2023, David et al.
U.S. Appl. No. 18/537,906, filed Dec. 13, 2023, Mangtani et al.
U.S. Appl. No. 18/538,520, filed Dec. 13, 2023, Chandra et al.
U.S. Appl. No. 18/417,582, filed Jan. 19, 2024, Taylor.
U.S. Appl. No. 18/430,841, filed Feb. 2, 2024, Thompson et al.
U.S. Appl. No. 18/438,831, filed Feb. 12, 2024, David et al.
U.S. Appl. No. 18/443,469, filed Feb. 16, 2024, David et al.
U.S. Appl. No. 18/594,168, filed Mar. 4, 2024, Thompson et al.
U.S. Appl. No. 18/606,252, filed Mar. 15, 2024, Mangtani et al.
U.S. Appl. No. 18/633,685, filed Apr. 12, 2024, Balakrishnan et al.
U.S. Appl. No. 18/779,495, filed Jul. 22, 2024, David et al.
U.S. Appl. No. 18/976,702, filed Dec. 11, 2024, Casu et al.
Analog Devices, "Single-/Dual-Supply, High Voltage Isolated IGBT Gate Driver with Miller Clamp", ADuM4135 Data Sheet, Rev. E, 2015; 17 pages.
Bourgeois, "An Isolated Gate 25 Drive For Power MOSFETs and IGBTs", STMicroelectronics Group, AN461/0194, 1999; 7 pages.
Silicon Labs, "Si827x Datasheet," Preliminary Rev. 0.5, Silicon Laboratories Inc., 2016; 43 pages.
U.S. Appl. No. 19/216,991, filed May 23, 2025, Bastien et al.
U.S. Appl. No. 19/332,389, filed Sep. 18, 2025, Vu et al.

* cited by examiner

1100

```
┌─────────────────────────────────────────────────────────────────────┐
│ Providing transmission circuitry configured to provide power pulses │
│ for first and second channels                                       │
│ 1102                                                                │
└─────────────────────────────────────────────────────────────────────┘
                                    ↓
┌─────────────────────────────────────────────────────────────────────┐
│ Providing a first-channel transmitting coil disposed on a first     │
│ substrate and having a circular shape with first and second ends    │
│ adjacent to each other separated by an air gap, wherein the         │
│ first-channel transmitting coil is configured to receive the power  │
│ pulses from the transmission circuitry for the first channel        │
│ 1104                                                                │
└─────────────────────────────────────────────────────────────────────┘
                                    ↓
┌─────────────────────────────────────────────────────────────────────┐
│ Providing a second-channel transmitting coil disposed on the first  │
│ substrate and having a circular shape with first and second ends    │
│ adjacent to each other and separated by an air gap, wherein the     │
│ second transmitting coil includes one or more twists, wherein for   │
│ each twist one coil segment crosses over another coil segment,      │
│ wherein the second-channel transmitting coil is configured to       │
│ receive the power pulses from the transmission circuitry            │
│ for the second channel                                              │
│ 1106                                                                │
└─────────────────────────────────────────────────────────────────────┘
                                    ↓
┌─────────────────────────────────────────────────────────────────────┐
│ Providing a first-channel receiving coil disposed on a second       │
│ substrate, having a circular shape with first and second ends       │
│ adjacent to each other and separated by an air gap, wherein the     │
│ first-channel receiving coils is configured to receive transmitted  │
│ power from the first-channel transmitting coil for the first        │
│ channel, wherein the second substrate is spaced apart from the      │
│ first substrate                                                     │
│ 1108                                                                │
└─────────────────────────────────────────────────────────────────────┘
                                    ↓
┌─────────────────────────────────────────────────────────────────────┐
│ Providing a pair of second-channel receiving coils disposed on the  │
│ second substrate and configured to receive transmitted power from   │
│ the second-channel transmitting coil for the second channel,        │
│ wherein each of the second-channel receiving coils has a circular   │
│ shape with first and second ends adjacent to each other and         │
│ separated by an air gap, and wherein each of the second receiving   │
│ coils includes at least one twist wherein one coil segment crosses  │
│ over another coil segment                                           │
│ 1110                                                                │
└─────────────────────────────────────────────────────────────────────┘
                                    ↓
┌─────────────────────────────────────────────────────────────────────┐
│ Providing reception circuitry configured to receive power from the  │
│ first-channel receiving coil and the pair of second-channel         │
│ receiving coils                                                     │
│ 1112                                                                │
└─────────────────────────────────────────────────────────────────────┘
```

*FIG. 11*

WIRELESS POWER TRANSMISSION WITH CHANNEL REDUNDANCY

BACKGROUND

Transmission of electrical power to electrical components of rotating electro-mechanical systems has typically involved the use of slip rings, also called rotary electrical interfaces, rotating electrical connectors, collectors, swivels, or electrical rotary joints.

A slip ring is an electromechanical device that allows the transmission of power and electrical signals between structures that have relative rotational motion with respect to each other. Slip rings are commonly found in slip ring motors, electrical generators for alternating current (AC) systems, and alternators. They can be used on any rotating object to transfer power, to control circuits, or to transfer analog or digital signals including data.

While use of slip rings may be suitable for some applications, the direct contact between electrically conductive components leads to wear, due to friction, and reduced service life.

SUMMARY

Aspects, examples, and embodiments of the present disclosure are directed to and include systems, circuits, apparatus, and methods providing wireless electrical power and/or communication signal transmission with channel redundancy.

One general aspect of the present disclosure includes a wireless power transmission system with channel redundancy. The wireless power transmission system (which may also transmit communication signals) can include: transmission circuitry configured to provide power for first and second channels; a first-channel transmitting coil disposed on a first substrate and having a circular shape with first and second ends separated by a gap, where the first-channel transmitting coil is configured to receive power from the transmission circuitry for the first channel; a second-channel transmitting coil disposed on the first substrate and having a circular shape with first and second ends separated by a gap, where the second transmitting coil includes one or more twists, where for each twist one coil segment crosses over another coil segment, where the second-channel transmitting coil is configured to receive power from the transmission circuitry for the second channel; a first-channel receiving coil disposed on a second substrate, having a circular shape with first and second ends adjacent to each other and separated by a gap, where the first-channel receiving coils is configured to receive transmitted power from the first-channel transmitting coil for the first channel, where the second substrate is spaced apart from the first substrate; a pair of second-channel receiving coils disposed on the second substrate and configured to receive transmitted power from the second-channel transmitting coil for the second channel, where each of the second-channel receiving coils has a circular shape with first and second ends adjacent to each other and separated by a gap, and where each of the second receiving coils incudes at least one twist where one coil segment crosses over another coil segment; and reception circuitry configured to receive power from the first-channel receiving coil and the pair of second-channel receiving coils.

Implementations may include one or more of the following features. The transmission circuitry may include first and second (or additional) integrated circuits (ICs) configured to provide power to the first-channel transmitting coil and the second-channel transmitting coil, respectively; and where the reception circuitry may include third and fourth (or additional) ICs configured to receive power from the first-channel receiving coil and the pair of second-channel receiving coils, respectively. The system may include: a first capacitive data channel configured to relay data between the first IC and the third IC; and a second capacitive data channel configured to relay data between the second and fourth IC. The first and second capacitive data channels each may include a first pair of ring electrodes disposed on the first substrate and a second pair of ring electrodes disposed on the second substrate facing one another.

The summed number of twists in the coils for the first channel can be an integer (Nt1) greater than or equal to zero; and where the summed number of twists for the coils of the second channel is an integer (Nt2) greater than or equal to one; and where Nt1 does not equal Nt2. The first-channel transmitting coil and the second-channel transmitting coil each may include a respective plurality of loops. The twists of the pair of second-channel receiving coils may be positioned orthogonal to each other. The transmission circuitry and reception circuitry may be configured to transmit data between the first-channel and second-channel transmitting coils and the first-channel and second-channel receiving coils. The transmission circuitry can be configured to transmit data by modulating loading on one or more of the reception coils. The transmission circuitry and reception circuitry can be configured to transmit data using a spread spectrum technique. The first and second ICs may be configured for rotation about a common axis with respect to each other. The system may include a steering column having first and second rotatable members connected by a torsion bar, and at least one sensor configured to detect rotation of the first and second rotatable members with respect to each other. The transmission circuitry and/or the reception circuitry can be configured to calculate an angle of rotation between the first and second substrates based on power transfer efficiency between the coils of the first channel and/or the coils of the second channel. Calculation of the rotation angle can include calculating a torque applied to the steering column based on the angle of rotation between the first and second substrates. The pair of second-channel receiving coils can be configured to combine received power of each coil of the pair.

Another general aspect includes a method of making a wireless power transmission system with channel redundancy. The method can include: providing transmission circuitry configured to provide power pulses for first and second channels; providing a first-channel transmitting coil disposed on a first substrate and having a circular shape with first and second ends adjacent to each other separated by a gap, where the first-channel transmitting coil is configured to receive the power pulses from the transmission circuitry for the first channel; providing a second-channel transmitting coil disposed on the first substrate and having a circular shape with first and second ends adjacent to each other and separated by a gap, where the second transmitting coil includes one or more twists, where for each twist one coil segment crosses over another coil segment, where the second-channel transmitting coil is configured to receive the power pulses from the transmission circuitry for the second channel; providing a first-channel receiving coil disposed on a second substrate, having a circular shape with first and second ends adjacent to each other and separated by a gap, where the first-channel receiving coils is configured to receive transmitted power from the first-channel transmitting coil for the first channel, where the second substrate is spaced apart from the first substrate; providing a pair of second-channel receiving coils disposed on the second substrate and configured to receive transmitted power from the second-channel transmitting coil for the second channel, where each of the second-channel receiving coils has a circular shape with first and second ends adjacent to each other and separated by a gap, and where each of the second receiving coils incudes at least one twist where one coil segment crosses over another coil segment; and providing reception circuitry configured to receive power from the first-channel receiving coil and the pair of second-channel receiving coils.

Implementations may include one or more of the following features. The transmission circuitry may include first and second integrated circuits (ICs) configured to provide power to the first-channel transmitting coil and the second-channel transmitting coil, respectively; and where the reception circuitry may include third and fourth ICs configured to receive power from the first-channel receiving coil and the pair of second-channel receiving coils, respectively. The method may include: a first capacitive data channel configured to relay data between the first IC and the third ICs; and a second capacitive data channel configured to relay data between the second and fourth ICs. The first and second capacitive data channels each may include a first pair of ring electrodes disposed on the first substrate and a second pair of ring electrodes disposed on the second substrate facing one another.

For the method, the summed number of twists in the coils for the first channel can be an integer (Nt1) greater than or equal to zero; and where the summed number of twists for the coils of the second channel is an integer (Nt2) greater than or equal to one; and where Nt1 does not equal Nt2. The first-channel transmitting coil and the second-channel transmitting coil each may include a respective plurality of loops. The twists of the pair of second-channel receiving coils can be positioned orthogonal to each other. The transmission circuitry and reception circuitry may be configured to transmit data between the first-channel and second-channel transmitting coils and the first-channel and second-channel receiving coils. The transmission circuitry can be configured to transmit data by modulating loading on one or more of the reception coils. The transmission circuitry and reception circuitry can be configured to transmit data using a spread spectrum technique. The first and second ICs can be configured for rotation about a common axis with respect to each other. The method may include providing a steering column having first and second rotatable members connected by a torsion bar, and at least one sensor configured to detect rotation of the first and second rotatable members with respect to each other. The transmission circuitry and/or the reception circuitry can be configured to calculate an angle of rotation between the first and second substrates based on power transfer efficiency between the coils of the first channel and/or the coils of the second channel. Calculation of the angle of rotation includes calculating a torque applied to the steering column based on the angle of rotation between the first and second substrates. The pair of second-channel receiving coils may be configured to combine received power of each coil of the pair.

Embodiments and implementations of the noted aspect(s) can include a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform actions, e.g., as described herein or related to such described actions.

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the present disclosure, which is susceptible of many embodiments. What follows is illustrative, but not exhaustive, of the scope of the present disclosure.

BRIEF DESCRIPTION OF THE DRAWINGS

The manner and process of making and using the disclosed embodiments may be appreciated by reference to the figures of the accompanying drawings. In the figures like reference characters refer to like components, parts, elements, or steps/actions; however, similar components, parts, elements, and steps/actions may be referenced by different reference characters in different figures. It should be appreciated that the components and structures illustrated in the figures are not necessarily to scale, emphasis instead being placed upon illustrating the principals of the concepts described herein. Furthermore, embodiments are illustrated by way of example and not limitation in the figures, in which:

FIG. 11 is a diagram showing steps in an example method of fabricating a wireless power and/or control signal transmission system with channel redundancy, in accordance with the present disclosure.

DETAILED DESCRIPTION

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The subject technology is susceptible of many embodiments. What follows is illustrative, but not exhaustive, of the scope of the subject technology.

Aspects, examples, and embodiments of the present disclosure are directed to and include systems, circuits, apparatus, and methods providing wireless power transmission with channel redundancy. Embodiments can be used for mechanical systems having rotating parts or components. Examples and embodiments of the present disclosure can provide wireless power transmission with channel redundancy that can overcome single-channel failure, e.g., in accordance with automotive safety integrity level (ASIL) D fail safe operational grade as specified by ISO 26262. Examples and embodiments can include two emission coils with different topologies along with three or four reception coils. The chosen topologies can be selected to ensure and/or facilitate minimal mutual inductance across topologies when the reception coils are rotated relative to the emission coils. Some examples and embodiments can be used for angle sensing at the same time as power transmission.

A key purpose in having low mutual inductance between coil sets is to facilitate channel separation. Having low mutual inductance means that if one coil set gets shorted out in the case of a failure, it does not drag down the other coil set. This is what allows for the fail safe operation. To minimize mutual inductance between coil systems (e.g., coils of different power transmission channels), twists can be added to the coil topologies to alter (produce alternations in) coil field polarity. For example, for two power transmission channels, two coil topologies can be chosen for the two respective coil systems so that the number of twists (Nt2) of the second coil system depends on the number of twists (Nt1) of the first coil system in accordance with the following equation:

$$Nt2=2(Nt1+1)-1 \quad \text{(EQ. 1)}$$

For example, topology 100a of FIG. 1, described below, represents the case where the number of twists of a first coil system (of a first power transmission channel) is equal to zero (Nt1 =0), which leads to the second coil system (of a second power transmission channel) having one (1) twist, i.e., in accordance with EQ. 1, given Nt1=0, then Nt2=1. Note: that embodiments of the present disclosure may have different values of Nt1; the coil system topology shown in FIG. 1 merely represents the simplest and most efficient case.

Figure 1:
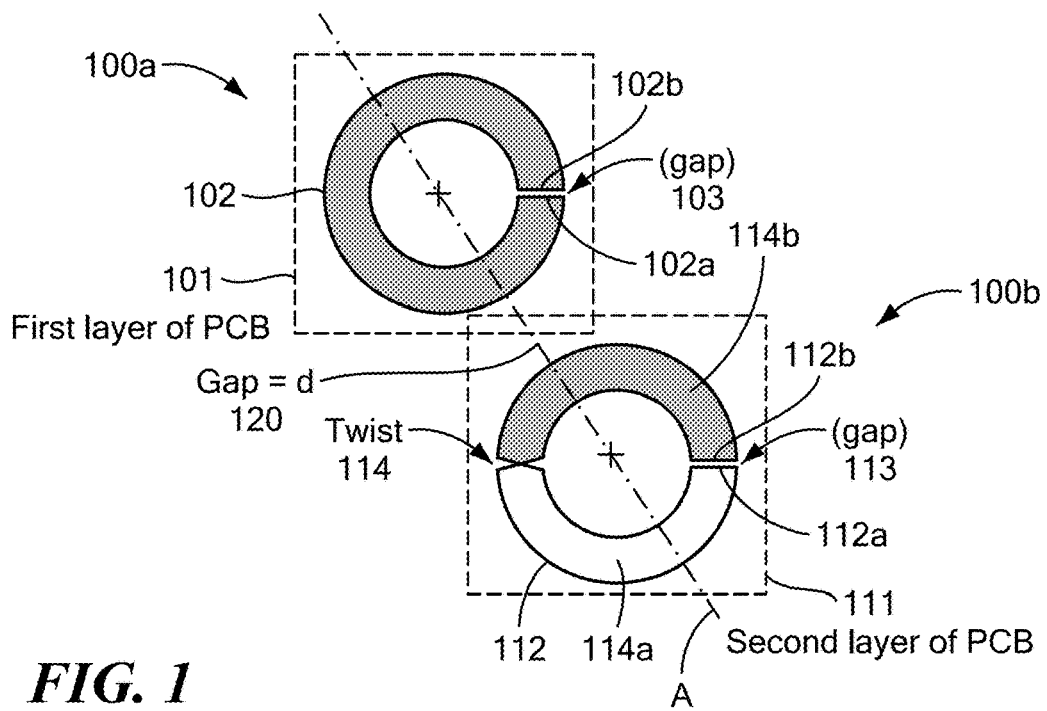
FIG. 1 is a top view showing example coil topologies for two coils used for wireless power and/or communication signal transmission in accordance with the present disclosure.

FIG. 1 is a top view showing example coil topologies 100a-b for two coils 102, 112 used for wireless power and/or communication signal transmission in accordance with the present disclosure. Coil 102 is shown disposed on/in a first PCB or first layer of a PCB 101 while coil 112 is shown disposed on/in a second PCB or a second layer of a PCB 111. The PCBs/PCB layers 101 and 111—and, likewise, coils 102 and 112—are configured parallel to each other and separated by a gap ("d") along an axis "A," as shown. The wire (conductive trace) of each coil 102, 112 is shown as the dark line. The base building block of topology 100a is an "O" shaped coil 102, having an opening or gap 103 between two ends 102a-b. The base building block of topology 100b is an "O" shaped coil 112 having a twist 114 and an opening or gap 113 between two ends 112a-b. The gaps 103, 113 can be selected or sized as desired.

The topology 100a of coil (base coil) 102 can be changed, e.g., in accordance with EQ. 1 (described above), by adding one or more twists (crossover sections where a portion of wire or a coil crosses over another portion of wire) as shown by topology 100b of coil 112. The respective shadings indicated for the coils indicates the polarity states of the emitted magnetic field at a given moment. One twist 114 is shown for coil 112, while the switching of shading between the different areas 114a, 114b indicates switching of polarity. Of course, while coils 102 and 112 are shown having a single coil loop, embodiments according to the present disclosure may include coils with multiples coils, e.g., as described in further detail below.

As noted above, aspects and embodiments of the present disclosure include wireless power and/or communication signal transmission systems including two power and/or communication signal transmission channels with two respective coil systems, offering fail-safe redundancy. Such dual-channel systems can include two substrates, one substrate with one or more emission, transmission, or transmit (Tx) coils, and one substrate with one or more reception, receiver, or receive (Rx) coils.

Figure 2:
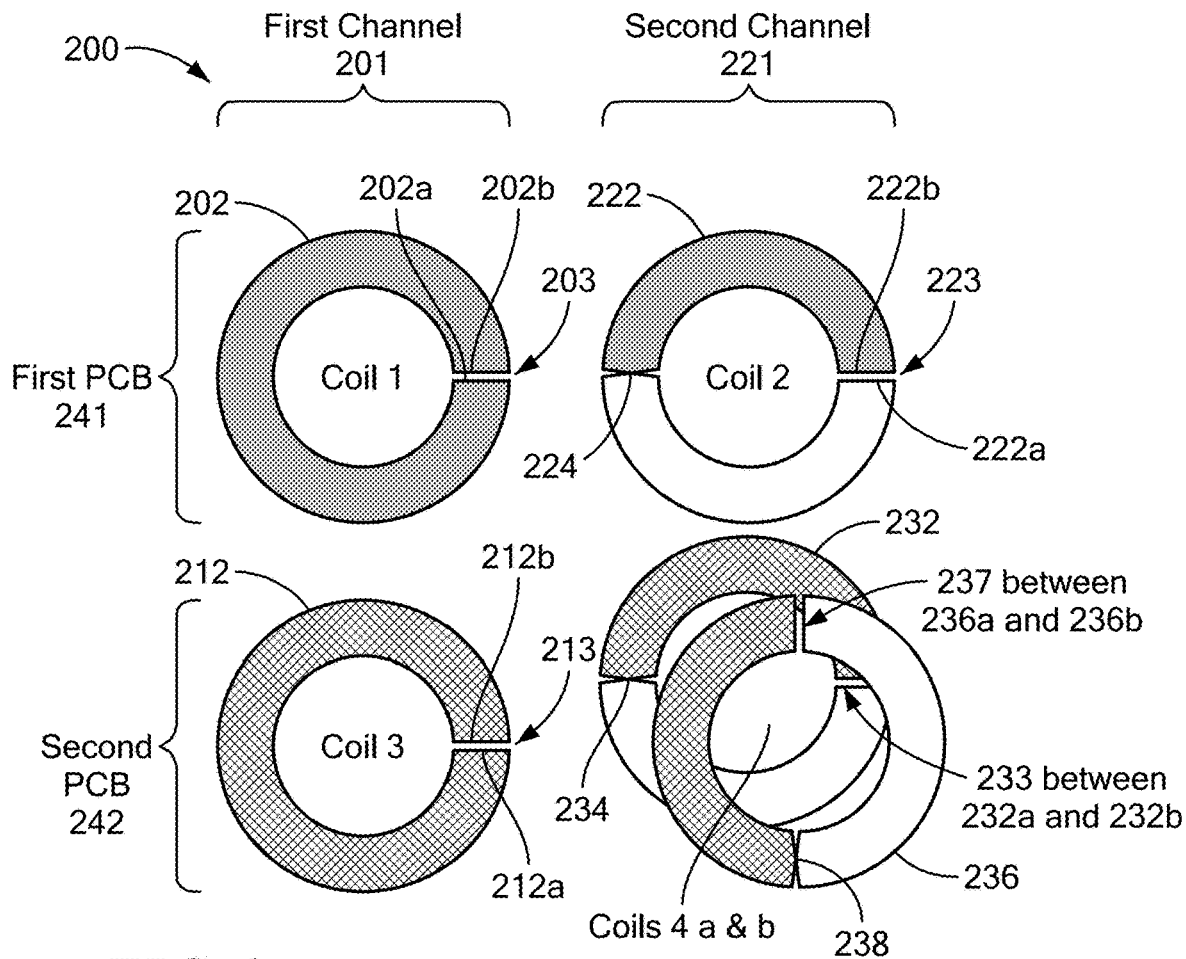
FIG. 2 is a top view showing an example coil topology with two transmit coils and three receive coils used for wireless power and/or communication signal transmission in accordance with the present disclosure.

FIG. 2 is a top view showing an example coil topology 200 with two transmit coils and three receive coils used for wireless power and/or communication signal transmission in accordance with the present disclosure. Topology 200 provides two coil systems 201, 221 for two transmission channels, Channels 1 and 2, providing fail safe redundancy for power transmission and/or communication (e.g., control) signal transmission.

As shown in FIG. 2, first coil system 201 (System 1) includes first emission coil 202 having gap 203 between first and second ends 202a-b. First coil system 201 also includes first reception coil 212, shown with gap 213 between first and second ends 212a-b. Second coil systems 221 includes second emission coil 222, shown with gap 223 between first and second ends 222a-b. Second emission coil 222 is further shown with twist (cross-over section) 223. Second coil system 222 (System 2) also includes second and third reception coils 232 and 236, shown with gaps 233 and 237 between ends 232a-b and 236a-b, respectively. Second and third reception coils 232, 236 include twists 234 and 238, respectively, which are arranged in an orthogonal configuration (rotated 90 degrees) relative to one another.

In the case where the number of twists is equal to zero (null), as shown by coil 202, the corresponding reception coil set preferably contains a single coil shown as shown by coil 212. In the case of a number of twists not equal to zero, the corresponding reception (Rx) coil set preferably contains two orthogonal coils as shown as coils 232, 234. In accordance with the present disclosure, an orthogonal state between coils (a.k.a., orthogonality) can be defined according to the following equation for tilt (i.e., degrees between twists):

$$\text{Tilt(degrees between twists)}=(180°/(Nt+1)) \quad \text{(EQ. 2)}$$

As further shown in FIG. 2, first and second emission coils 202, 222 are held (supported) by a first substrate, e.g., first PCB 241. Reception coils 212 and 232, 236 are held (supported) by a second substrate, e.g., second PCB 242. The substrates (e.g., PCBs) may have any suitable shape. First substrate (PCB) 241 and second substrate (PCB) 242 can be configured for rotation relative to one another, e.g., rotation about a rotational axis similar to axis A shown in FIG. 1. By such configuration, transmission channels 201, 221 can provide failsafe power transmission redundancy (e.g., complying with ASIL level 4) for mechanical systems having components that rotate with respect to one another. It will be understood that that the coil sets can be used for power transmission, communication signal transmission, or both. Examples of mechanical systems where embodiments of the present disclosure can be employed include, but are not limited to, torque sensors, as substitutes for slip rings, as substitutes for clock springs, etc.

For example, in some applications, first and second substrates (PCBs) 241, 242 may be mounted at different (separate) positions along a steering column having rotational axis (e.g., as shown by axis A in FIG. 1). The first and second substrates 241, 242 can be mounted such that the centers of curvatures (coil centers) of the respective coils are on the rotational axis, in some embodiments; in other embodiments, the substrates may be mounted such that the coil centers are off of the rotational axis. By being mounted respectively to separate portions of a steering column (e.g., a sleeve and a torsion bar, etc.) or related structure(s), the substrates (PCBs 241, 242) and related coils can rotate (undergo angular displacement) with respect to one another while still allowing for power and/or communication signal transmission between the coils.

Figure 3:
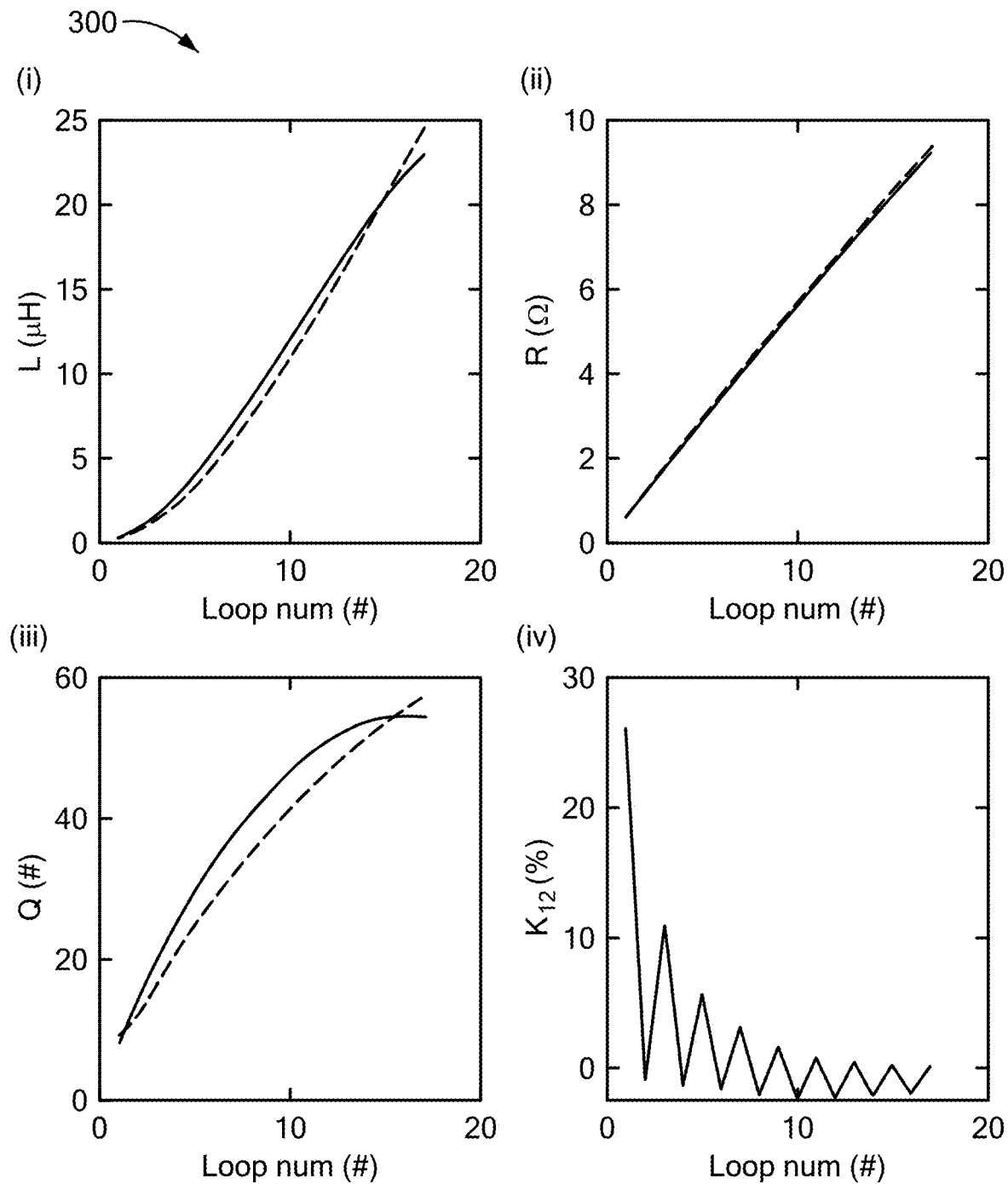
FIG. 3 includes a sets of plots showing electrical characteristics of the two example coil topologies shown in FIG. 1.

FIG. 3 includes a set 300 of plots (i)-(iv) showing electrical characteristics of the two example coil topologies shown in FIG. 1. Plots (i)-(iii) show the inductance, the resistance and the quality factor (assuming a resonance frequency of 3.5 MHz), respectively, of emission coils 102, 112 in FIG. 1. Plot (iv), at bottom right, shows the negligible coupling between both emission coils, highlighting the efficiency of the topology strategy of the present disclosure for decoupling redundant power transmission systems and corresponding power transmission channels.

Figure 4:
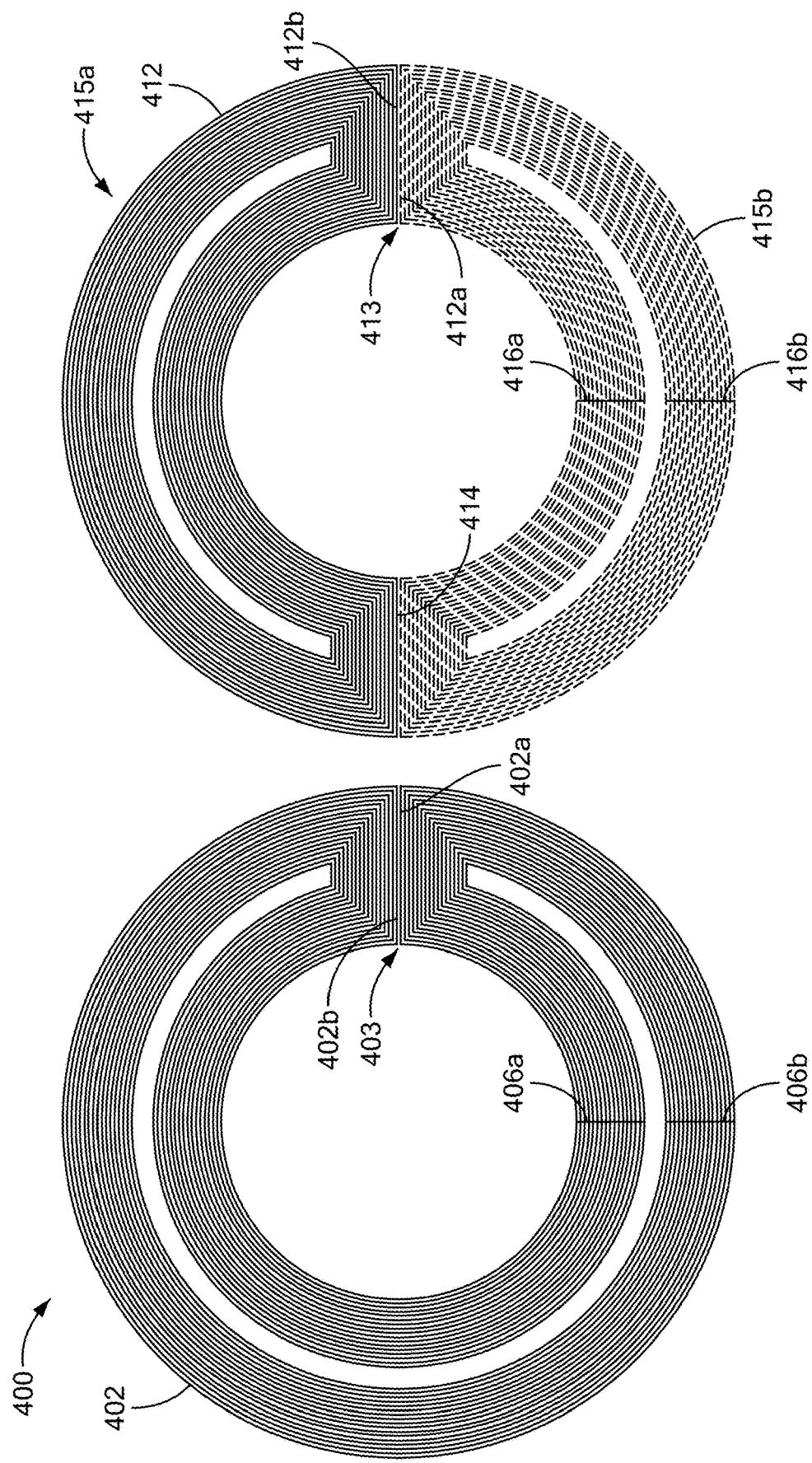
FIG. 4 is a top view of an example coil topology having coil structures with additional loops to maximize inductance in accordance with the present disclosure.

FIG. 4 is a top view of a coil topology 400 having coil structures 402 and 412 with additional loops to maximize inductance in accordance with the present disclosure. As shown, the coil topology can be built with multiple loops in the coils 402 and 412 so that all the traces are kept on two PCB layers. Coil 402 is shown having ends 402*a* and 402*b* separated by gap 403. Similarly coil 412 is shown having ends 412*a* and 412*b* separated by gap 413. Coil 402 is further shown with multiple coil loops as indicated by loop portions 406*a-b*. Likewise, coil 412 is further shown with multiple coil loops as indicated by loop portions 416*a-b*. Of course, a person of ordinary skill in the art would understand that the coil loops are a continuous conductive path-despite the loops being shown as not connected (which is a convenience taken for purposes of drawing the figure). The respective distances (spatial extends) of gaps of 403 and 413 may be selected as desired.

Coil 412 is shown with twist (cross-over section) 414, which a person of ordinary skill in the art would understand as being similar to as shown for twist 114 in FIG. 1—as FIG. 4 is shown without an actual twist for convenience in drawing the multiple coil loops for coil 412. Due to twist 414, coil 412 has two regions 415*a-b* that have reversed polarity when current is flowing in the coil. As described above, the regions of reversed polarity can serve to decouple coil 412 from coil 402, e.g., when the coils are acting as transmission coils for separate power transmission channels in accordance with the present disclosure.

Figure 5:
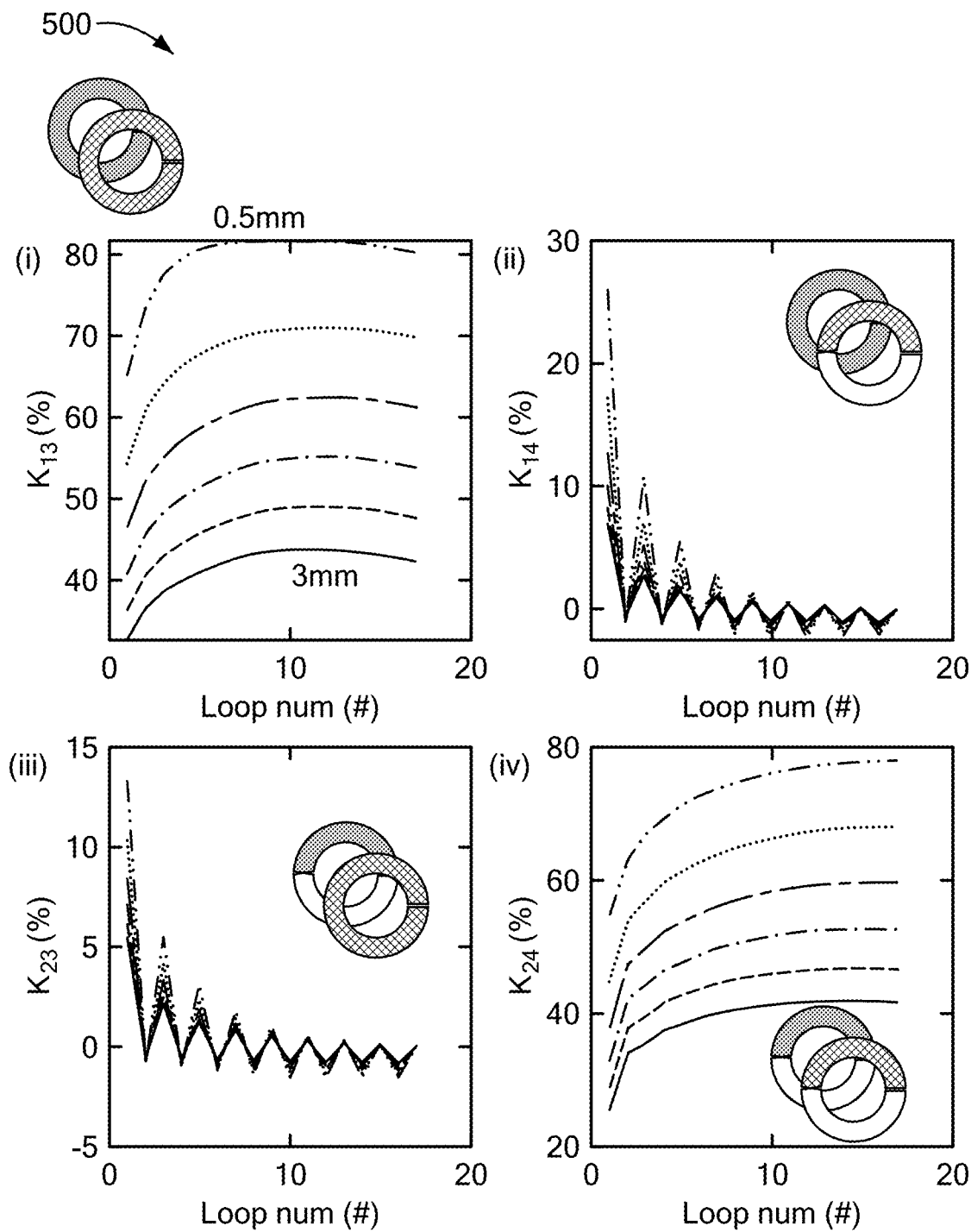
FIG. 5 includes a set of plots showing coupling factors between different coils for different separation distances.

FIG. 5 includes a set 500 of plots (i)-(iv) showing coupling factors between different coils shown for different separation distances. The plots are shown over a range of coil loop numbers, from 0 to 20.

Plot (i), at top left, shows the coupling between matching coils having base (twist-less) geometries similar to coil 102 in FIG. 1. Plot (ii), at upper right, shows the coupling between a transmission (Tx) coil with a base (twist-less) geometry (similar to coil 202 in FIG. 2) and a reception (Rx) having a single twist (similar to reception coil 232 in FIG. 2). Plot (iii), at lower left, shows the coupling factor between a transmission coil with a single-twist geometry (e.g., coil 222 in FIG. 2) and a reception coil having a base (twist-less) geometry (e.g., coil 212 in FIG. 2). Plot (iv), at lower right, shows the coupling factor between a transmission (Tx) coil having a single-twist geometry (e.g., coil 222 in FIG. 2) and a reception (Rx) coil having a single-twist (e.g., coil 232 in FIG. 2) when they are phase aligned. The color stands for the air gap (or simply "gap") between the PCBs, from dark red for 0.5 mm to dark blue for 3 mm with 0.5 mm steps.

In FIG. 5, the angle between the emission and reception PCBs (supporting the indicated emission and reception coils, respectively) is kept at 0° and the air gap varies from 0.5 mm up to 3 mm. As is indicated, only coils with matching topologies have non negligible coupling, i.e., those of plots (i) and (iv).

Figure 6:
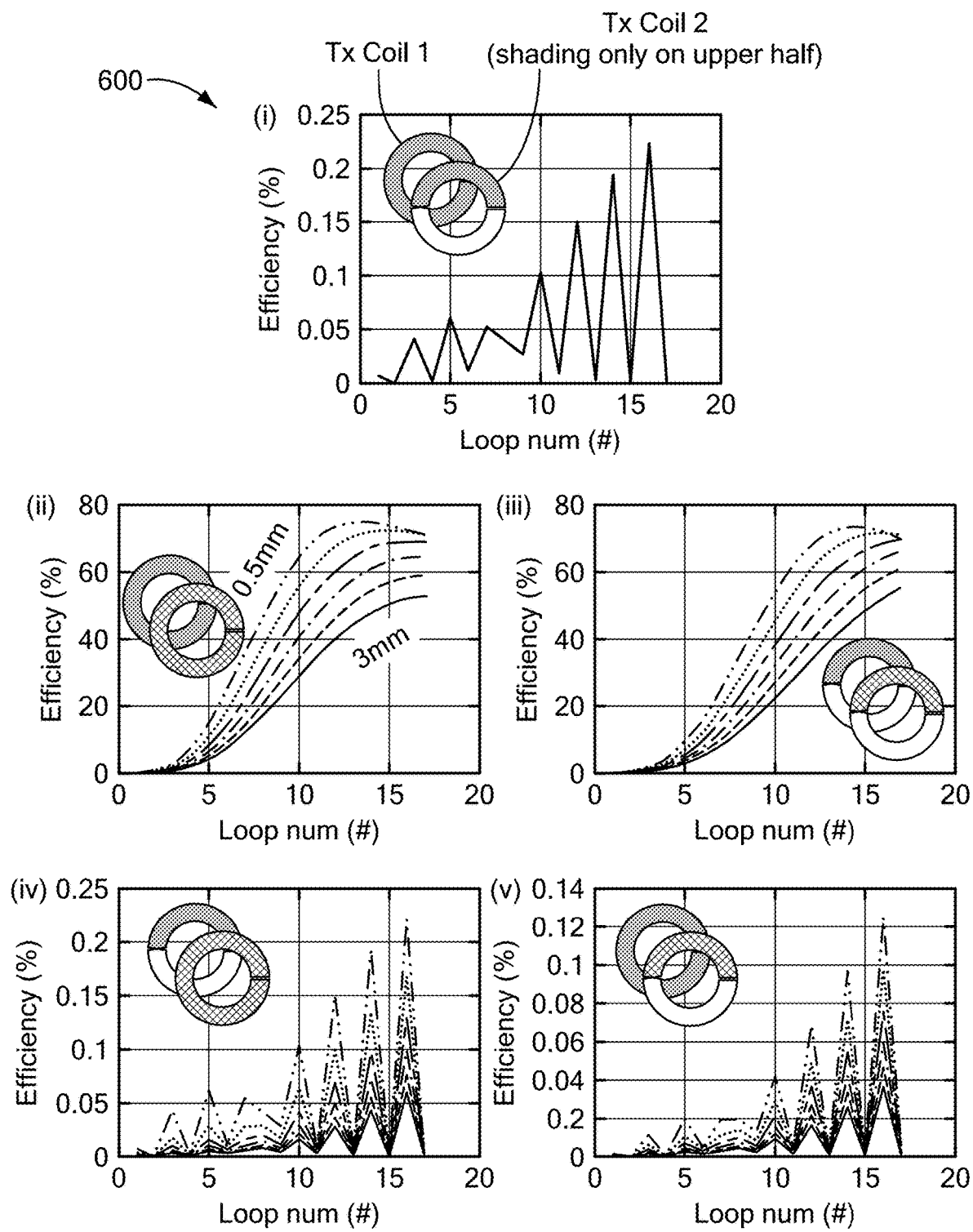
FIG. 6 includes a set of plots showing wireless power transmission efficiency over the number of loops in the coils for the different coils shown in FIG. 2.

FIG. 6 includes a set 600 of plots showing wireless power transmission efficiency over the number of loops in the coils having different geometries. Here again, the angle between the emission and reception PCBs (supporting the indicated emission and reception coils, respectively) is kept at 0° and the air gap between the PCBs is swept (stepped) from 0.5 mm to 3 mm (with the color scheme used for FIG. 5).

Plot (i) shows virtually no coupling between transmission coils having different topologies (twist-less vs. single-twist). As shown in plot (ii), a power transfer efficiency of 53% is achieved for a topology with no twist (twist-less) at 3 mm air gap. A power transfer efficiency of 55% is achieved for a topology with one twist (single-twist) at 3 mm air gap, as shown in plot (iii). Using seventeen (17) loops in the coils, the power transferred across topologies (from transmission coil with one topology to reception coil with a disparate topology) is lower than 0.01%, as shown by plots (iv) and (v).

Figure 7:
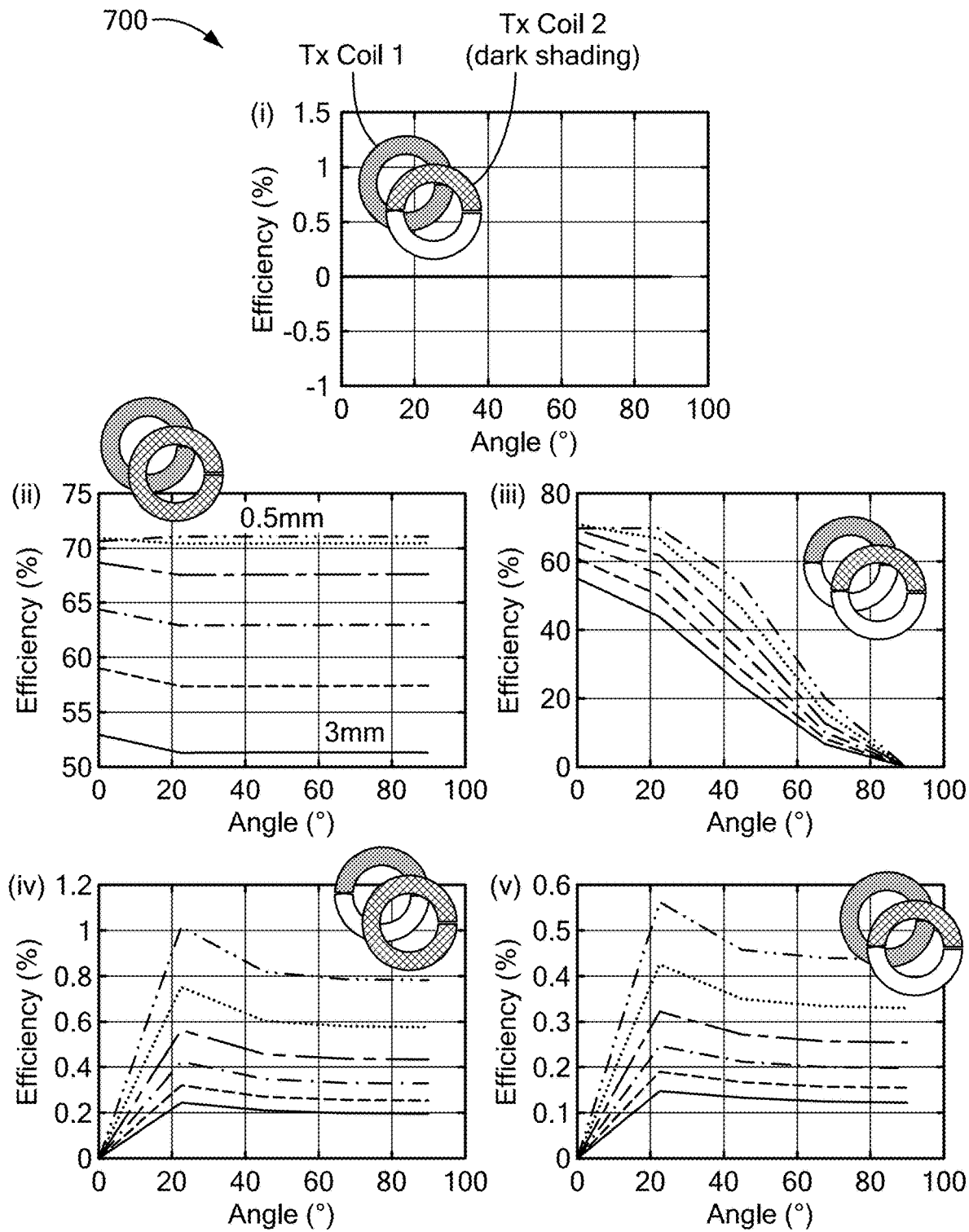
FIG. 7 includes a set of plots showing wireless power transmission efficiency over the angle between transmit (Tx) and receive (Rx) PCBs in accordance with the present disclosure.

FIG. 7 includes a set 700 of plots (i)–(v) showing wireless power transmission efficiency over the angle between transmit (Tx) and receive (Rx) PCBs in accordance with the present disclosure.

Plots (i)–(v) show the power efficiency between the possible pairs of coils shown in FIG. 1 and FIG. 2 while the reception PCB is rotating. As shown in plot (i), the power transmission efficiency of the coils of FIG. 1 (System 1) is relatively negligible and independent of the angle. In plots (ii)–(v), the color stands for the air gap between the PCBs (from dark red for 0.5 mm to dark blue for 3 mm with 0.5 mm steps).

As shown by plots (ii)–(v), the power efficiency of the coils of FIG. 2 (System 2 with two, redundant transmission channels) varies with the angle. The efficiency of power transmission between coil 2 (coil 222 of FIG. 2) and coil 4*a* (coil 232) is maximum at 0° and null at 90° while it is null at 0° and maximum at 90° between coil 2 (coil 222 of FIG. 2) and coil 4*b* (coil 232 of FIG. 2). Accordingly, in some embodiments, the power transfer for a coil topology with twists preferably includes orthogonal reception coils to pick up power over angle.

Plots (iv) and (v) also show that the power transfer efficiency across disparate coil topologies is maximum at about 20° with a maximum of 1% at 0.5 mm air gap. All these results suppose a source and load impedance of 50Ω. In some embodiments, source and/or load impedances could be tunable parameters, tunable to increase efficiency. Power transfer efficiency would be expected to increase with higher transmission frequencies.

Figure 8:
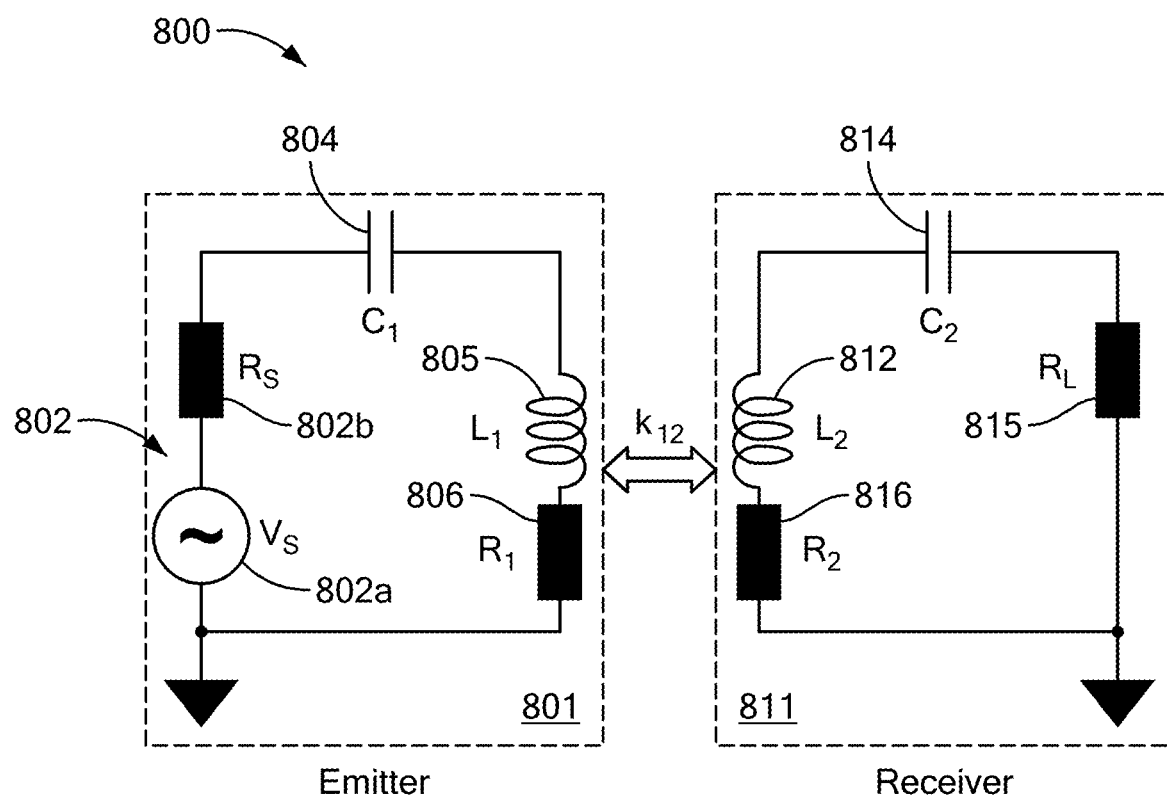
FIG. 8 is an electronic schematic of an example wireless power transmission system in accordance with the present disclosure.

FIG. 8 is an electronic schematic of an example wireless power transmission system 800 in accordance with the present disclosure.

Wireless power transmission system 800 includes two PCBs: an emission or transmission (Tx) PCB 801 and a reception or receiver (Rx) PCB 811. On the emission PCB 801, a power source 802, shown as voltage source Vs 802*a* with internal impedance Rs 802*b*, powers an emission LC tank having capacitor $C_1$ 804 and inductor (coil) $L_1$ 805, shown with corresponding coil resistance $R_1$ 806. On the reception PCB 811, a reception LC tank includes inductor (coil) $L_2$ 812, shown with corresponding coil resistance $R_2$, and capacitor C2 814, is connected to a load $R_L R_2$. The PCBs 801 and 811 are coupled via the magnetic field between the coils, when current is flowing, as indicated by coupling factor $k_{12}$.

Figure 9:
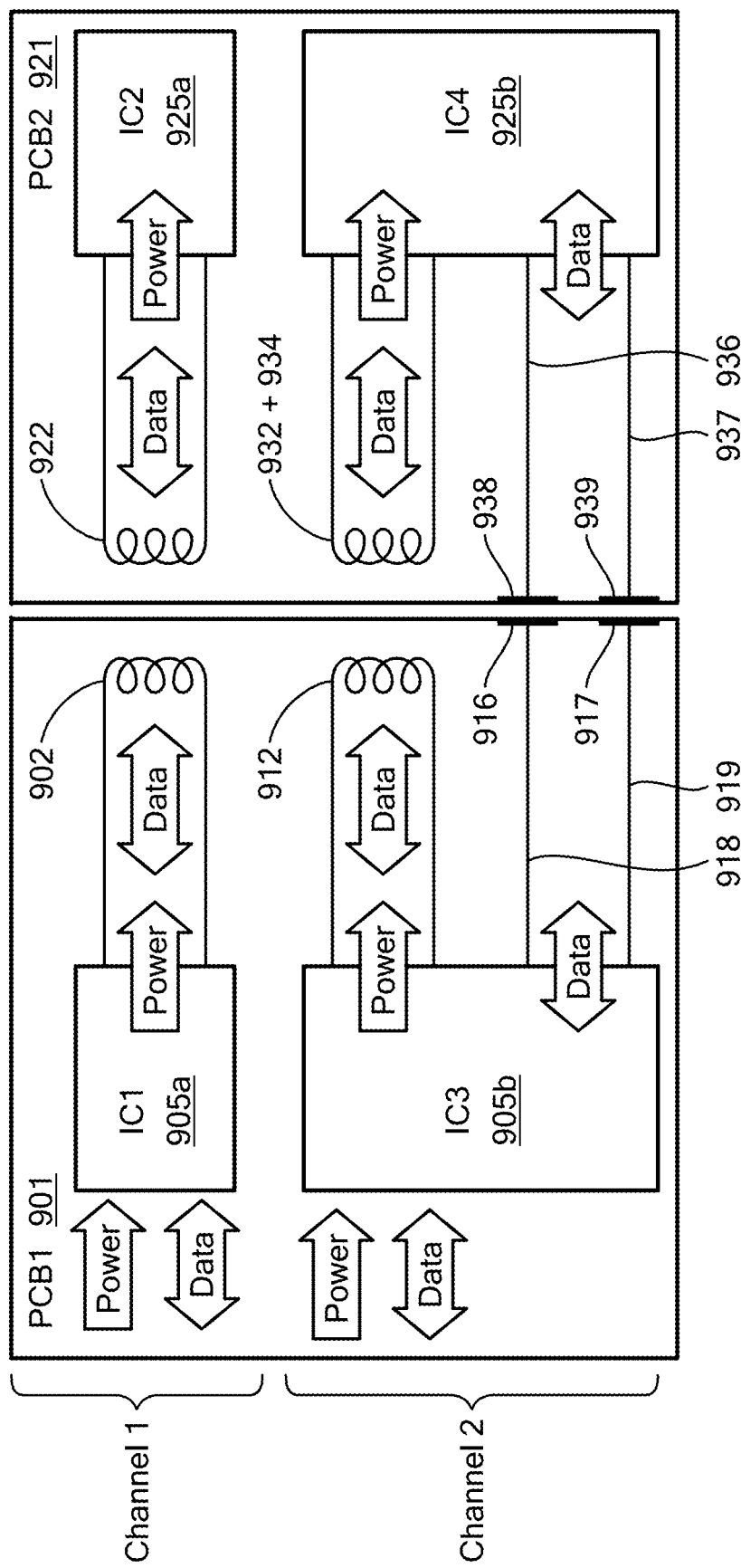
FIG. 9 is a diagram showing an example system with emission PCB and IC on the left and reception PCB on the right in accordance with the present disclosure.

FIG. 9 is a diagram showing an example wireless power and/or communication signal transfer system 900 with an emission PCB 901 on the left with first and second ICs 905*a-b* (labeled IC1 and IC3, respectively) and a reception PCB 921 on the right with first and second reception ICs 925*a-b* (labeled IC2 and IC4, respectively), in accordance with the present disclosure.

As shown in FIG. 9, IC 905*a* (IC1) is connected to coil 902 while IC 925*a* (IC2) is connected to coil 922, forming a first channel (Channel 1). Similarly, IC 905*b* (IC3) is connected to coil 912 while IC 925*b* (IC2) is connected to coil set 932+934, forming a second channel (Channel 2). The two channels so formed provide redundant and decoupled power and/or communication signal transmission. In some embodiments, the coils 902 and 912 (on transmission PCB 901) and coils 922 and 932+934 (on reception PCB 921) can have topologies similar to those of FIG. 2.

For Channel 2, IC 905*b* and IC 925B are shown including an optional capacitive interface providing communication links. The capacitors for the noted (optional) capacitive interface are shown as represented by first and second plates (e.g., circular plates) 916 and 938, respectively, and third and fourth plates 917 and 939, respectively. Conductive traces 918-919 and 936-937 are also shown connecting the noted capacitors to the IC 905*b* (IC3) and IC 925*b* (IC4) for the capacitive interface.

In operation of system 900, IC1 powers IC2 with one coil set and gets data back either on that coil set or through a capacitor (e.g., as shown for Channel 2). Then, IC3 (same side as IC1) powers and talks with IC4 (same side as IC2). IC1 and IC3 will have separate power and data lines going to them from the outside, e.g., as shown at left. This shows how one can have two completely independent systems on the same PCB which can be fail operational. For example, if either of IC1 or IC2 has any issue for Channel 1, IC3 and IC4 will continue to operate for Channel 2.

In some embodiments, data can be transmitted from reception (receiver) PCB 921 back to emission (emitter) PCB 901, by simply modulating the loading on the power reception coils, e.g., one or more of reception coils 922, 932, and/or 934. The data represented by such a modulation scheme (method or technique) can be sensed by the emission IC (e.g., 905*a*) by sensing how much current is passing in the respective transmission coil (e.g., coil 902 or 912). Because the Tx and Rx coils are coupled, a modulated short in a Rx coil will modulate the current in the respective Tx coil. Such a modulation scheme may provide a low-power (potentially using the least power) method to transfer data (e.g., when considering power consumption on the reception PCB side).

Figure 10A:
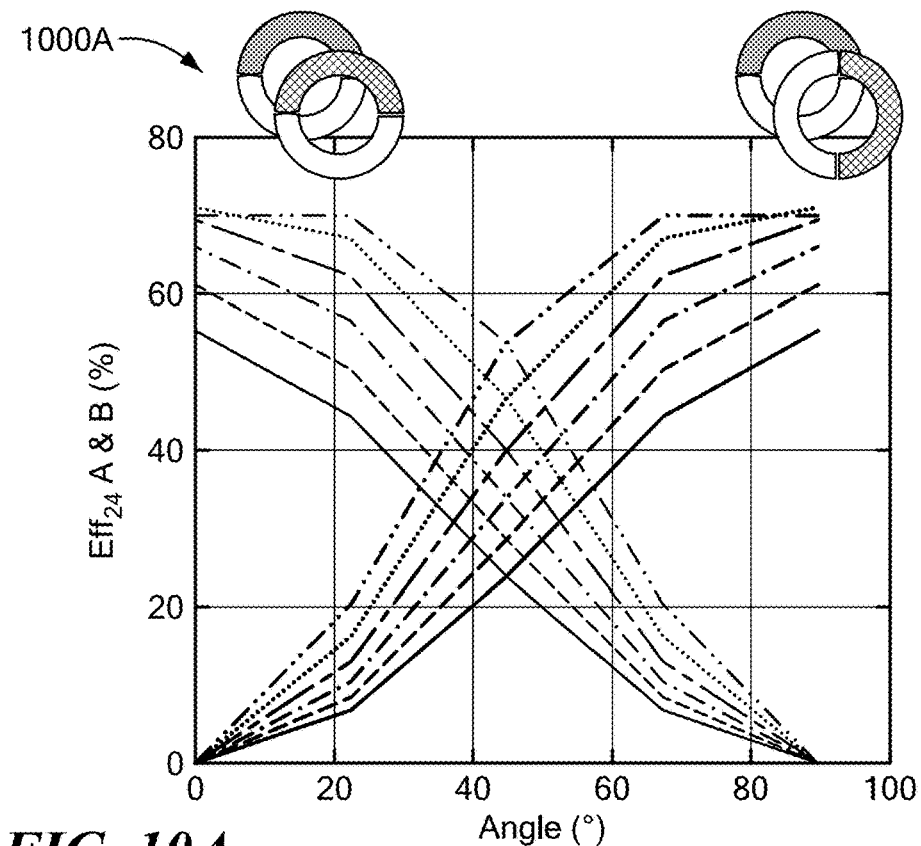
FIGS. 10A-10B show plots of the power transmission efficiency of an example redundant channel coil-based power and/or communication signal transmission system having a coil configuration similar to as shown for Channel 2 in FIG. 2, over a range of rotation, in accordance with the present disclosure.
Figure 10B:
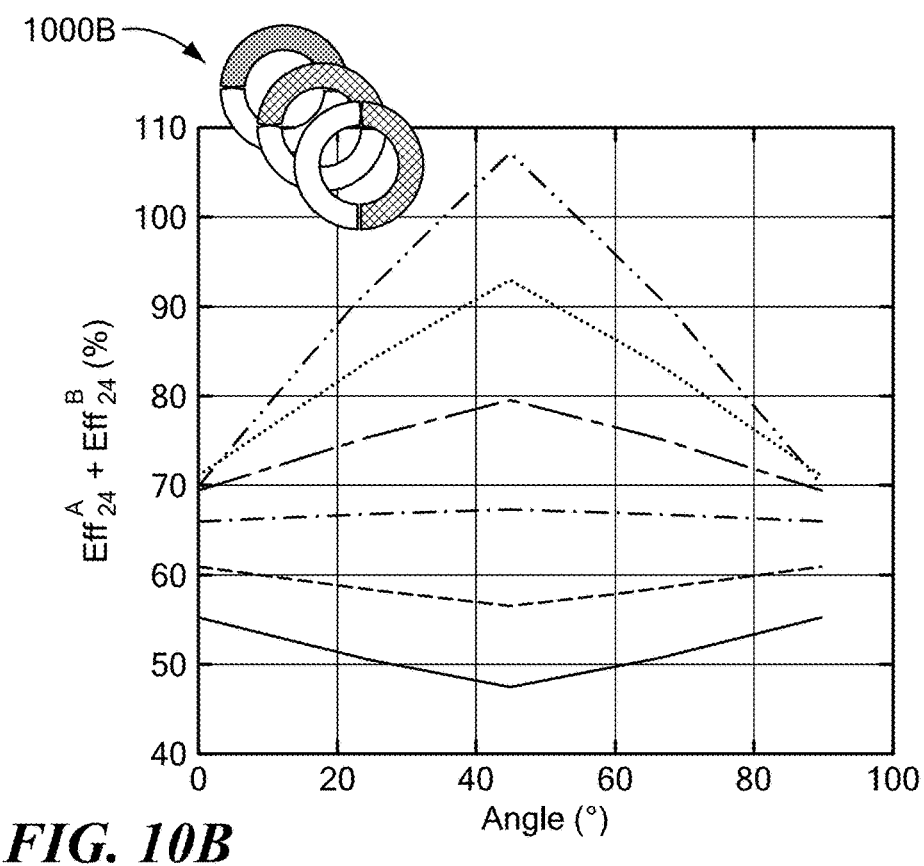

FIGS. 10A-10B show plots 1000A-1000B of the power transmission efficiency of an example redundant channel coil-based power and/or control signal transmission system having a coil configuration similar to as shown for Channel 2 in FIG. 2, over a range of rotation, in accordance with the present disclosure. For each figure, the color for each different plot stands for the air gap between the indicated PCBs (from dark red for 0.5 mm to dark blue for 3 mm with 0.5 mm steps).

In FIG. 10A, plot 1000A shows the power transmission efficiency for a coil configuration similar to as shown for Channel 2 in FIG. 2, with coils 2 and 4A (solid lines) and for coils 2 and 4B (dashed lines). The indicated range of rotation is 90 degrees.

In FIG. 10B, plot 1000B shows the sum of the power efficiency of the system referenced for FIG. 10B. It will be noted that this is an approximation (over a limited or truncated domain) as this calculation does not consider the splitting of the power between the Rx coils at angles other than 0 degrees and 90 degrees.

FIG. 11 is a diagram showing steps in an example method 1100 of fabricating a wireless power and/or control signal transmission system with channel redundancy, in accordance with the present disclosure. As shown, method 1100 can include providing transmission circuitry configured to provide power (e.g., as pulses) for first and second channels, as described at 1102. A first-channel transmitting coil can be provided that disposed on a first substrate and having a circular shape with first and second ends adjacent to each other separated by an air gap, wherein the first-channel transmitting coil is configured to receive the power pulses from the transmission circuitry for the first channel, as described at 1104. A second-channel transmitting coil disposed on the first substrate and having a circular shape with first and second ends adjacent to each other and separated by an air gap (a.k.a., gap), wherein the second transmitting coil includes one or more twists, wherein for each twist one coil segment crosses over another coil segment, wherein the second-channel transmitting coil is configured to receive the power pulses from the transmission circuitry for the second channel, as described at 1106.

A first-channel receiving coil can be provided that is disposed on a second substrate, having a circular shape with first and second ends adjacent to each other and separated by an air gap, wherein the first-channel receiving coils is configured to receive transmitted power from the first-channel transmitting coil for the first channel, wherein the second substrate is spaced apart from the first substrate, as described at 1108. One or more (e.g., a pair of) second-channel receiving coils can be provided that is/are disposed on the second substrate and configured to receive transmitted power from the second-channel transmitting coil for the second channel, wherein each of the second-channel receiving coils has a circular shape with first and second ends adjacent to each other and separated by an air gap, and wherein each of the second receiving coils incudes at least one twist wherein one coil segment crosses over another coil segment, as described at 1110. Reception circuitry can be provided that is configured to receive power and/or communication signals from the first-channel receiving coil and the pair of second-channel receiving coils, as described at 1112.

Figure 12:
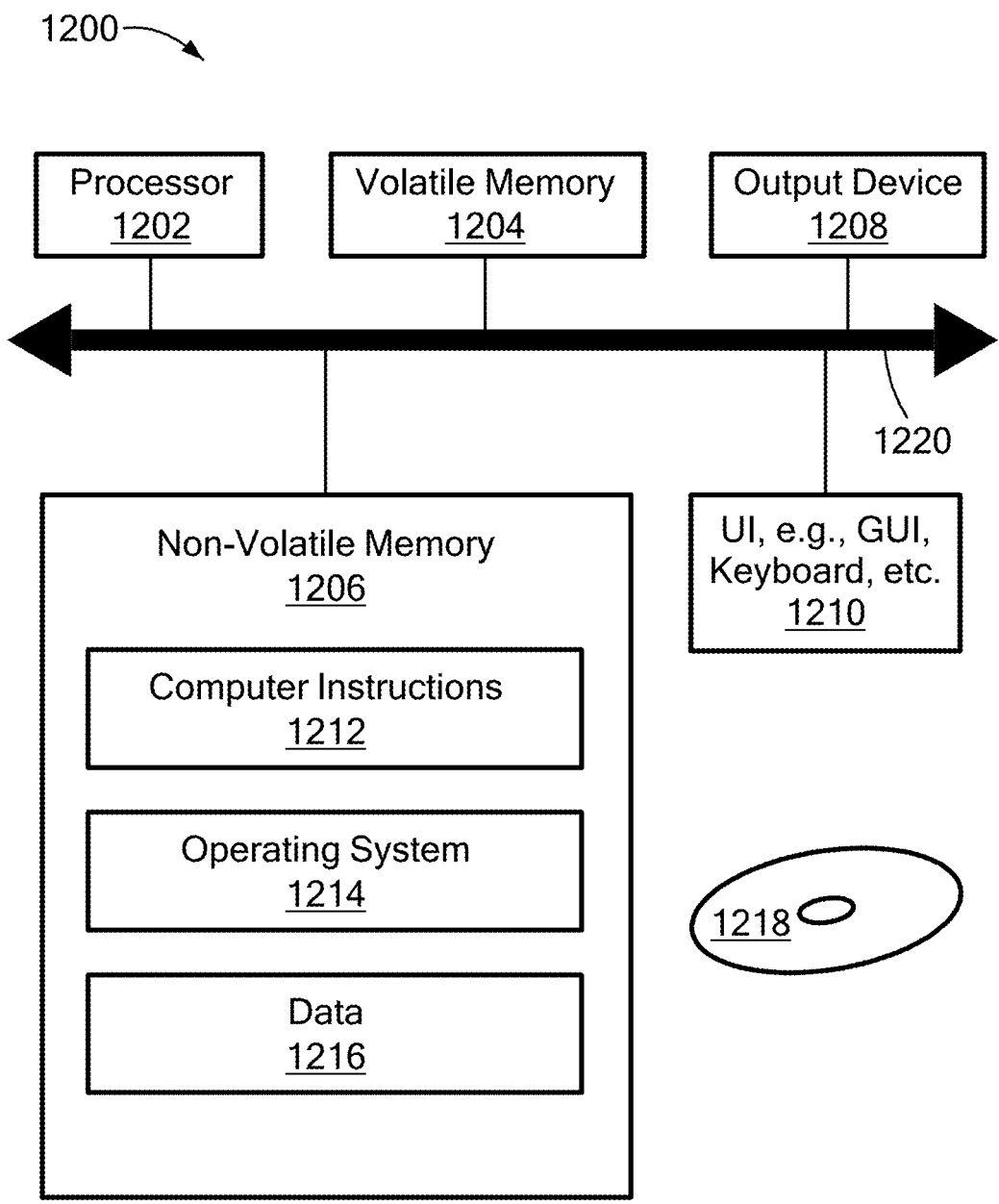
FIG. 12 shows an example computing system, in accordance with the present disclosure.

FIG. 12 shows an example computing system 1200, in accordance with the present disclosure. System 1200 (and/or similar or equivalent systems) can perform all or at least a portion of the processing, e.g., steps in the algorithms and methods as described herein. Such processing can include, but is not limited to: designing transmission and reception coils; calculating relative angular position of first and second substrates (PCBs) having transmission and reception coils, respectively; calculating a torque applied to a steering column or other elastic member having transmission and reception PCBs mounted at different locations, etc.

The computer system 1200 can includes a processor 1202, a volatile memory 1204, a non-volatile memory 1206 (e.g., hard disk), an output device 1208 and a user input or interface (UI) 1210, e.g., graphical user interface (GUI), a mouse, a keyboard, a display, and/or any common user interface, etc. The non-volatile memory (non-transitory storage medium) 1206 stores computer instructions 1212 (a.k.a., machine-readable instructions or computer-readable instructions) such as software (computer program product), an operating system 1214 and data 1216. In one example, the computer instructions 1212 are executed by the processor 1202 out of (from) volatile memory 1204. In one embodiment, an article/apparatus 1218 (e.g., a storage device or medium such as a hard disk, an optical disc, magnetic storage tape, optical storage tape, flash drive, etc.) includes or stores the non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), and optionally at least one input device, and one or more output devices. Program code may be applied to data entered using an input device or input connection (e.g., port or bus) to perform processing and to generate output information.

The system 1200 can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry, e.g., an FPGA (field programmable gate array) and/or an ASIC (application-specific integrated circuit).

Further example embodiments include the following:

A redundant power transfer coil system with no (or essentially no) coupling between redundant channels despite overlapping of the coils (e.g., a physical condition where the coils are stacked relative to a common central axis).

A method to design the transmission and reception coils.

A system for wireless power transmission having two PCBs: (A) a first PCB with two emission coils with low mutual inductance, and optionally, a ring (electrode or plate) for capacitive data transfer, and an IC configured for (i) passing power to the power emission coils, (ii) sending and reading data either through the capacitive ring or through the power emission coils, and/or (iii) managing communication with the rest of the system; (B) a second PCB with two sets of reception coils matching the emission coils from the first PCB, and optionally, a ring for capacitive data transfer, an IC configured for (i) gathering passed power, (ii) either passing the power to other ICs or using it internally if it contains a sensor or an interface in the case of an inductive sensor, (iii) sending and reading data either through the capacitive ring or through the (power) emission coils, (iv) (optional) a set of emission and reception coils for inductive sensing, and (v) (optional) other ICs.

Example benefits/advantages: Accordingly, embodiments and/or examples of the inventive subject matter can afford various benefits relative to prior art techniques. For example, embodiments of the present disclosure can be useful for:

Clock spring replacement, e.g., providing elimination or reduction of wear (no wear out);

Providing redundancy with only two PCBs (in a small area);

Application to torque sensors, e.g., by allowing a direct measurement of the torque instead of measuring two angles and subtracting them. This simpler measurement can provide lower error sources, simpler PCBs, etc.; and/or Slip ring replacement, e.g., offering elimination or reduction of wear (no wear out).

Various embodiments of the concepts, systems, devices, structures, and techniques sought to be protected are described above with reference to the related drawings. Alternative embodiments can be devised without departing from the scope of the concepts, systems, devices, structures, and techniques described. For example, in some embodiments, primary and/or secondary transformer coils may have a whole number or a fractional number of turns (loops or structures configured around a related magnetic core), e.g., 1.5, 2.5, 1.75, 1.8, 2.25, 5, 6.5, 8.8, etc. Moreover, while embodiments of the present disclosure have been described above and shown in the accompanying figures as having generally circular shapes, coils with other alternate shapes (e.g., elliptical, rectangular, square, etc.) may be used within the scope of the present disclosure.

It is noted that various connections and positional relationships (e.g., over, below, adjacent, etc.) may be used to describe elements and components in the description and drawings. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, which includes a list of elements is not necessarily limited to only those elements but can include other elements not expressly listed or inherent to such apparatus, method, composition, mixture, or article.

Additionally, the term "exemplary" means "serving as an example, instance, or illustration." Any embodiment or design described as "exemplary" is not necessarily to be construed as preferred or advantageous over other embodiments or designs. The terms "one or more," and "at least one" may indicate any integer number greater than or equal to one, i.e., one, two, three, four, etc.; those terms, however, may refer to fractional numbers/values where context admits, e.g., a number of loops in a transformer coil may be a plurality that includes a fractional value, e.g., 2.75, 3.5, 4.25, etc. The term "plurality" any integer or fractional (e.g., decimal) number greater than one. The term "connection" can include an indirect connection and a direct connection.

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases do not necessarily refer to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed but are used merely as labels to distinguish one claim element having a certain name from another element having a same name (but for use of the ordinal term) to distinguish the claim elements.

The terms "approximately" and "about" may be used to mean within +20% of a target (or nominal) value in some embodiments, within plus or minus (+) 10% of a target value in some embodiments, within +5% of a target value in some embodiments, and yet within +2% of a target value in some embodiments. The terms "approximately" and "about" may include the target value. The term "substantially equal" may be used to refer to values that are within +20% of one another in some embodiments, within +10% of one another in some embodiments, within +5% of one another in some embodiments, and yet within +2% of one another in some embodiments.

The term "substantially" may be used to refer to values that are within +20% of a comparative measure in some embodiments, within +10% in some embodiments, within +5% in some embodiments, and yet within +2% in some embodiments. For example, a first direction that is "substantially" perpendicular to a second direction may refer to a first direction that is within +20% of making a 90° angle with the second direction in some embodiments, within +10% of making a 90° angle with the second direction in some embodiments, within +5% of making a 90° angle with the second direction in some embodiments, and yet within +2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and implemented in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions as far as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A wireless power transmission system with channel redundancy, the system comprising:
  transmission circuitry configured to provide power for first and second channels;
  a first-channel transmitting coil disposed on a first substrate and having a circular shape with first and second ends separated by a gap, wherein the first-channel transmitting coil is configured to receive power from the transmission circuitry for the first channel;
  a second-channel transmitting coil disposed on the first substrate and having a circular shape with first and second ends separated by a gap, wherein the second transmitting coil includes one or more twists, wherein for each twist one coil segment crosses over another coil segment, wherein the second-channel transmitting coil is configured to receive power from the transmission circuitry for the second channel;

a first-channel receiving coil disposed on a second substrate, having a circular shape with first and second ends adjacent to each other and separated by a gap, wherein the first-channel receiving coils is configured to receive transmitted power from the first-channel transmitting coil for the first channel, wherein the second substrate is spaced apart from the first substrate;

a pair of second-channel receiving coils disposed on the second substrate and configured to receive transmitted power from the second-channel transmitting coil for the second channel, wherein each of the second-channel receiving coils has a circular shape with first and second ends adjacent to each other and separated by a gap, and wherein each of the second receiving coils incudes at least one twist wherein one coil segment crosses over another coil segment; and reception circuitry configured to receive power from the first-channel receiving coil and the pair of second-channel receiving coils.

2. The system of claim 1, wherein the transmission circuitry includes first and second integrated circuits (ICs) configured to provide power to the first-channel transmitting coil and the second-channel transmitting coil, respectively; and wherein the reception circuitry comprises third and fourth ICs configured to receive power from the first-channel receiving coil and the pair of second-channel receiving coils, respectively.

3. The system of claim 2, further comprising: a first capacitive data channel configured to relay data between the first IC and the third IC; and a second capacitive data channel configured to relay data between the second and fourth IC.

4. The system of claim 3, wherein the first and second capacitive data channels each comprise a first pair of ring electrodes disposed on the first substrate and a second pair of ring electrodes disposed on the second substrate facing one another.

5. The system of claim 1, wherein a summed number of twists in the coils for the first channel is an integer (Nt1) greater than or equal to zero; and wherein a summed number of twists for the coils of the second channel is an integer (Nt2) greater than or equal to one; and wherein Nt1 does not equal Nt2.

6. The system of claim 3, wherein the number of twists of the second channel is in accordance with:

$$Nt2=2(Nt1+1)-1.$$

7. The system of claim 1, wherein the first-channel transmitting coil and the second-channel transmitting coil each comprise a respective plurality of loops.

8. The system of claim 1, wherein the twists of the pair of second-channel receiving coils are positioned orthogonal to each other.

9. The system of claim 1, wherein the transmission circuitry and reception circuitry are configured to transmit data between the first-channel and second-channel transmitting coils and the first-channel and second-channel receiving coils.

10. The system of claim 9, wherein the transmission circuitry is configured to transmit data by modulating loading on one or more of the reception coils.

11. The system of claim 9, wherein the transmission circuitry and reception circuitry are configured to transmit data using a spread spectrum technique.

12. The system of claim 2, wherein the first and second ICs are configured for rotation about a common axis with respect to each other.

13. The system of claim 12, further comprising a steering column having first and second rotatable members connected by a torsion bar, and at least one sensor configured to detect rotation of the first and second rotatable members with respect to each other.

14. The system of claim 13, wherein the transmission circuitry and/or the reception circuitry is configured to calculate an angle of rotation between the first and second substrates based on power transfer efficiency between the coils of the first channel and/or the coils of the second channel.

15. The system of claim 14, wherein calculation of the rotation angle includes calculating a torque applied to the steering column based on the angle of rotation between the first and second substrates.

16. The system of claim 1, wherein the pair of second-channel receiving coils are configured to combine received power of each coil of the pair.

17. A method of making a wireless power transmission system with channel redundancy, the method comprising:
providing transmission circuitry configured to provide power pulses for first and second channels;
providing a first-channel transmitting coil disposed on a first substrate and having a circular shape with first and second ends adjacent to each other separated by a gap, wherein the first-channel transmitting coil is configured to receive the power pulses from the transmission circuitry for the first channel;
providing a second-channel transmitting coil disposed on the first substrate and having a circular shape with first and second ends adjacent to each other and separated by a gap, wherein the second transmitting coil includes one or more twists, wherein for each twist one coil segment crosses over another coil segment, wherein the second-channel transmitting coil is configured to receive the power pulses from the transmission circuitry for the second channel;
providing a first-channel receiving coil disposed on a second substrate, having a circular shape with first and second ends adjacent to each other and separated by a gap, wherein the first-channel receiving coils is configured to receive transmitted power from the first-channel transmitting coil for the first channel, wherein the second substrate is spaced apart from the first substrate;
providing a pair of second-channel receiving coils disposed on the second substrate and configured to receive transmitted power from the second-channel transmitting coil for the second channel, wherein each of the second-channel receiving coils has a circular shape with first and second ends adjacent to each other and separated by a gap, and wherein each of the second receiving coils incudes at least one twist wherein one coil segment crosses over another coil segment; and
providing reception circuitry configured to receive power from the first-channel receiving coil and the pair of second-channel receiving coils.

18. The method of claim 17, wherein the transmission circuitry includes first and second integrated circuits (ICs) configured to provide power to the first-channel transmitting coil and the second-channel transmitting coil, respectively;

and wherein the reception circuitry comprises third and fourth ICs configured to receive power from the first-channel receiving coil and the pair of second-channel receiving coils, respectively.

19. The method of claim 18, further comprising: a first capacitive data channel configured to relay data between the first IC and the third IC; and a second capacitive data channel configured to relay data between the second and fourth IC.

20. The method of claim 19, wherein the first and second capacitive data channels each comprise a first pair of ring electrodes disposed on the first substrate and a second pair of ring electrodes disposed on the second substrate facing one another.

21. The method of claim 17, wherein a summed number of twists in the coils for the first channel is an integer (Nt1) greater than or equal to zero; and wherein a summed number of twists for the coils of the second channel is an integer (Nt2) greater than or equal to one; and wherein Nt1 does not equal Nt2.

22. The method of claim 19, wherein the number of twists of the second channel is in accordance with:

$$N+2=2(Nt1+1)-1.$$

23. The method of claim 17, wherein the first-channel transmitting coil and the second-channel transmitting coil each comprise a respective plurality of loops.

24. The method of claim 17, wherein the twists of the pair of second-channel receiving coils are positioned orthogonal to each other.

25. The method of claim 17, wherein the transmission circuitry and reception circuitry are configured to transmit data between the first-channel and second-channel transmitting coils and the first-channel and second-channel receiving coils.

26. The method of claim 25, wherein the transmission circuitry is configured to transmit data by modulating loading on one or more of the reception coils.

27. The method of claim 25, wherein the transmission circuitry and reception circuitry are configured to transmit data using a spread spectrum technique.

28. The method of claim 18, wherein the first and second ICs are configured for rotation about a common axis with respect to each other.

29. The method of claim 28, further comprising a steering column having first and second rotatable members connected by a torsion bar, and at least one sensor configured to detect rotation of the first and second rotatable members with respect to each other.

30. The method of claim 29, wherein the transmission circuitry and/or the reception circuitry is configured to calculate an angle of rotation between the first and second substrates based on power transfer efficiency between the coils of the first channel and/or the coils of the second channel.

31. The method of claim 30, wherein calculation of the angle of rotation includes calculating a torque applied to the steering column based on the angle of rotation between the first and second substrates.

32. The method of claim 17, wherein the pair of second-channel receiving coils are configured to combine received power of each coil of the pair.

* * * * *